United States Patent
Lin et al.

(10) Patent No.: US 10,849,076 B2
(45) Date of Patent: Nov. 24, 2020

(54) PHYSICAL RANDOM ACCESS CHANNEL PREAMBLE RETRANSMISSION FOR NR

(71) Applicant: MEDIATEK INC., Hsinchu (TW)

(72) Inventors: Guan-Yu Lin, Hsinchu (TW); Chiou-Wei Tsai, Hsinchu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/014,242

(22) Filed: Jun. 21, 2018

(65) Prior Publication Data
US 2018/0376428 A1    Dec. 27, 2018

Related U.S. Application Data

(60) Provisional application No. 62/524,663, filed on Jun. 26, 2017.

(51) Int. Cl.
| | |
|---|---|
| H04W 52/14 | (2009.01) |
| H04W 72/04 | (2009.01) |
| H04W 16/28 | (2009.01) |
| H04W 74/08 | (2009.01) |
| H04W 52/42 | (2009.01) |
| H04W 52/22 | (2009.01) |
| H04W 52/36 | (2009.01) |
| H04W 52/50 | (2009.01) |
| H04W 24/10 | (2009.01) |

(52) U.S. Cl.
CPC ......... H04W 52/146 (2013.01); H04W 16/28 (2013.01); H04W 52/228 (2013.01);
(Continued)

(58) Field of Classification Search
CPC ........... H04W 72/046; H04W 74/0833; H04W 52/146; H04W 52/42; H04W 52/50;
(Continued)

(56) References Cited

U.S. PATENT DOCUMENTS

| | | | | |
|---|---|---|---|---|
| 2010/0232318 A1* | 9/2010 | Sarkar | .................. | H04W 28/18 370/254 |
| 2014/0177607 A1* | 6/2014 | Li | ........................ | H04B 7/0695 370/336 |

(Continued)

FOREIGN PATENT DOCUMENTS

| | | |
|---|---|---|
| CN | 102448158 A | 10/2010 |
| CN | 103327596 A | 3/2012 |

OTHER PUBLICATIONS

R1-1704943, NR Random Access Procedure, 3GPP TSG-RAN WG1 #88bis (Year: 2017).*

(Continued)

Primary Examiner — Raymond S Dean
(74) Attorney, Agent, or Firm — Imperium Patent Works; Zheng Jin

(57) ABSTRACT

A method of physical random-access channel (PRACH) preamble retransmission for new radio (NR) is proposed. A power ramping counter is introduced in addition to a preamble transmission counter for a RACH procedure. A UE determines the preamble TX power based on the power ramping counter. The UE updates the power ramping counter based on each PRACH transmission condition, which comprises both a selected DL beam and a selected UL beam for preamble transmission. The power ramping counter is incremented by one if the transmission condition remains the same as a previous PRACH preamble transmission. On the other hand, the power ramping counter remains unchanged if the transmission condition is different from a previous PRACH preamble transmission.

16 Claims, 4 Drawing Sheets

(52) U.S. Cl.
CPC ......... *H04W 52/362* (2013.01); *H04W 52/42* (2013.01); *H04W 52/50* (2013.01); *H04W 72/0473* (2013.01); *H04W 74/0833* (2013.01); *H04W 24/10* (2013.01)

(58) Field of Classification Search
CPC ............. H04W 52/228; H04W 52/362; H04W 72/0473; H04W 24/10; H04W 16/28
See application file for complete search history.

(56) References Cited

U.S. PATENT DOCUMENTS

| | | | | |
|---|---|---|---|---|
| 2015/0003278 | A1* | 1/2015 | Yang | H04W 24/02 370/252 |
| 2015/0092552 | A1 | 4/2015 | Bajj et al. | 370/235 |
| 2015/0296525 | A1* | 10/2015 | Kim | H04W 16/32 370/329 |
| 2017/0251460 | A1* | 8/2017 | Agiwal | H04W 72/0406 |
| 2018/0324850 | A1* | 11/2018 | Amuru | H04J 11/0073 |
| 2018/0359784 | A1* | 12/2018 | Agiwal | H04W 74/0833 |

OTHER PUBLICATIONS

International Search Report and Written Opinion of International Search Authority for PCT/CN2018/092798 dated Sep. 3, 2018 (9 pages).
R1-1704943 3GPP TSG-RAN WG1 #88bis, Nokia et al., "NR Random Access Procedure", Spokane, USA, Apr. 3-7, 2017 (9 pages).

* cited by examiner

PHYSICAL RANDOM ACCESS CHANNEL PREAMBLE RETRANSMISSION FOR NR

CROSS REFERENCE TO RELATED APPLICATIONS

This application claims priority under 35 U.S.C. § 119 from U.S. Provisional Application No. 62/524,663, entitled "NR-PRACH Preamble Retransmission," filed on Jun. 26, 2017, the subject matter of which is incorporated herein by reference.

TECHNICAL FIELD

The disclosed embodiments relate generally to wireless network communications, and, more particularly, to physical random-access channel (PRACH) preamble retransmission in new radio (NR) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention based random access procedures.

In LTE MAC layer, a preamble transmission counter is introduced for two usages. First, it can be used to detect random access problem or unsuccessful RACH procedure completion. The preamble transmission counter increments by one when a random-access response is not received as a response of the transmitted preamble. Second, it can be used to calculate a preamble transmission power. The UE ramps the preamble transmission power every time when it retransmits the preamble. The increased amount of power for preamble retransmission, compared to the power for the first preamble transmission, is proportional to the preamble transmission counter. Therefore, in LTE, preamble transmission counter is also used to calculate the amount of ramped power, i.e. power ramping counter.

The bandwidth shortage increasingly experienced by mobile carriers has motivated the exploration of the underutilized Millimeter Wave (mmWave) frequency spectrum between 3G and 300G Hz for the next generation 5G broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

5G new radio (NR) beamforming wireless systems support power ramping for PRACH preamble transmission. However, in NR beam-formed PRACH, the power ramping counter is no longer the same as the preamble transmission counter. This is because for multi-beam operation, UE may perform UL beam switching during retransmission. If the UE conducts beam switching, the counter for power ramping remains unchanged. If the UE does not change beam, the counter for power ramping keeps increasing. As a result, the preamble transmission counter cannot be used as the power ramping counter for preamble power determination.

A solution is sought.

SUMMARY

A method of physical random-access channel (PRACH) preamble retransmission for new radio (NR) is proposed. A power ramping counter is introduced in addition to a preamble transmission counter for a RACH procedure. A UE determines the preamble TX power based on the power ramping counter. The UE updates the power ramping counter based on each PRACH transmission condition, which comprises both a selected DL beam and a selected UL beam for preamble transmission. The power ramping counter is incremented by one if the transmission condition remains the same as a previous PRACH preamble transmission. On the other hand, the power ramping counter remains unchanged if the transmission condition is different from a previous PRACH preamble transmission.

In one embodiment, a user equipment (UE) receives downlink transmission from a base station over a plurality of downlink beams in a beamforming wireless communications network. The UE selects an uplink beam for physical random-access channel (PRACH) transmission of a RACH procedure, where the UE also selects a PRACH preamble corresponds to a selected downlink beam. The UE determines a preamble TX power based on a power ramping counter for the RACH transmission. The UE transmits the PRACH preamble from the UE to the base station using the determined preamble TX power.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
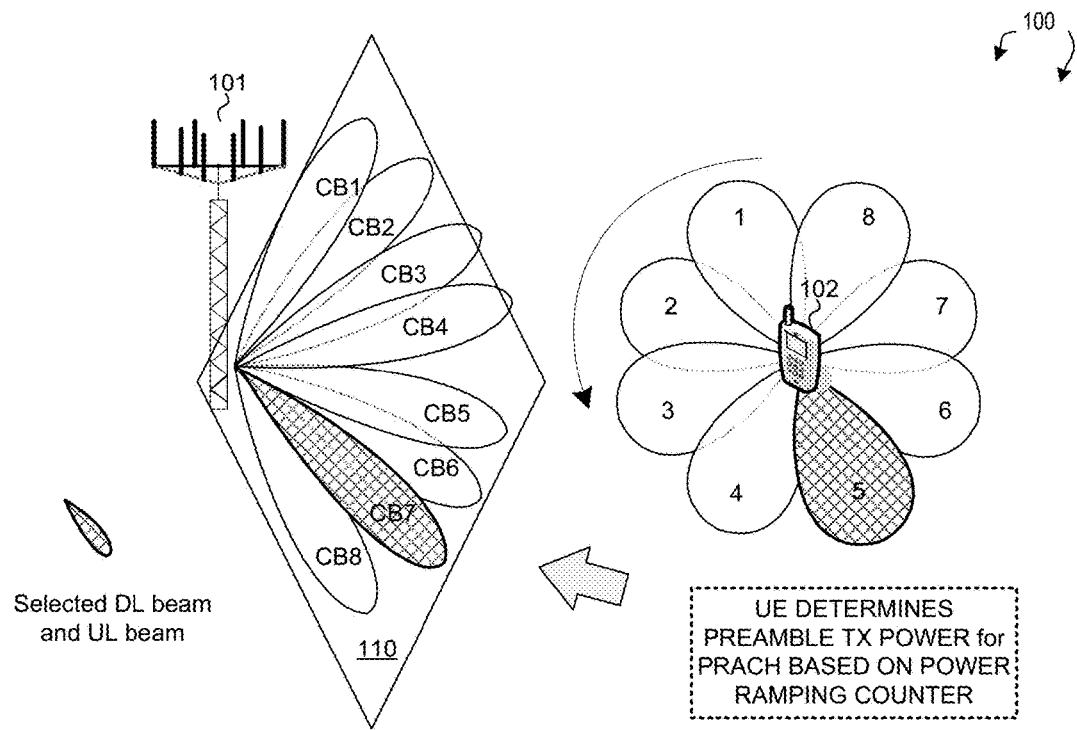
FIG. 1 illustrates a beamforming wireless communications system with new radio random-access channel (NR-RACH) procedure and PRACH preamble transmission in accordance with a novel aspect.

FIG. 1 illustrates a beamforming wireless communications system 100 with new radio random-access channel (NR-RACH) procedure and PRACH preamble transmission in accordance with a novel aspect. Beamforming mmWave mobile communication network 100 comprises a base station BS 101 and a user equipment UE 102. The mmWave cellular network uses directional communication with narrow beams and can support multi-gigabit data rate. Directional communication is achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of coarse TX/RX control beams. For example, cell 110 is covered by a set of eight downlink (DL) control beams CB1 to CB8. The collection of the DL beams CB1-CB8 covers an entire service area of cell 110. Each DL beam transmits a set of known reference signals for the purpose of initial time-frequency synchronization, identification of the control beam that transmits the reference signals, and measurement of radio channel quality for the control beam that transmits the reference signals. In NR systems, each of the DL beams are used to transmit a corresponding system synchronization block (SSB) or a corresponding channel state information reference signal (CSI-RS).

When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling. Furthermore, physical random-access channel (PRACH) is used by the UE to establish connection with the base station. In NR systems, a PRACH resource includes pre-defined PRACH preambles and pre-allocated resource blocks, which are associated with corresponding DL beams.

In downlink DL-based beam management, the BS side provides opportunities for UE to measure beamformed channel of different combinations of BS TX beams CB1-CB8 and UE RX beams 1-8. For example, BS 101 performs periodic beam sweeping with reference signal (RS) carried on individual BS TX beams. UE 102 measures beamformed channel state by using different UE RX beams 1-8 and report the measurements to BS. For RACH procedure, there is an association between PRACH resource and DL beam. By UE measurements, some DL beams have lower reference signal received power (RSRP), and some DL beams have higher RSRP. The UE can select one PRACH from PRACHs associated with a DL beam above a predefined RSRP threshold. How the UE selects an DL beam from those DL beam above the predefined RSRP threshold could be up to UE implementation.

5G new radio (NR) beamforming wireless systems support power ramping for PRACH preamble transmission. However, in NR beam-formed PRACH, the preamble transmission power is no longer the same as the preamble transmission counter. This is because for multi-beam operation, UE may perform UL beam switching during each PRACH preamble retransmission. How UE select/switch UL beam for each preamble retransmission may be highly dependent to UE implementation. If the UE conducts beam switching, there is no need to increase the counter for power ramping because current transmission power may be enough on another select UL or DL beam. If the UE does not change beam, the counter for power ramping is preferred to keep increasing because the selected beams are not changed. As a result, whether to increase preamble transmission power is related to whether UE send preamble with the same beam, and therefore the preamble transmission counter cannot be used as the power ramping counter for PRACH preamble TX power determination.

In accordance with one novel aspect, a power ramping counter is introduced in addition to the preamble transmission counter for RACH procedure. UE determines the preamble TX power based on the power ramping counter. UE updates the power ramping counter based on each PRACH transmission condition, which comprises both the selected DL beam and the selected UL beam for preamble transmission. In the example of FIG. 1, UE 102 selects DL CB7 and UL beam 5 for PRACH preamble transmission. DL CB7 is associated with a corresponding PRACH preamble and allocated radio resources. The power ramping counter is incremented by one if the transmission condition does not change, e.g., increase TX power for PRACH preamble transmission; otherwise, the power ramping counter is not changed, e.g. try again with the same TX power for PRACH preamble transmission.

Figure 2:
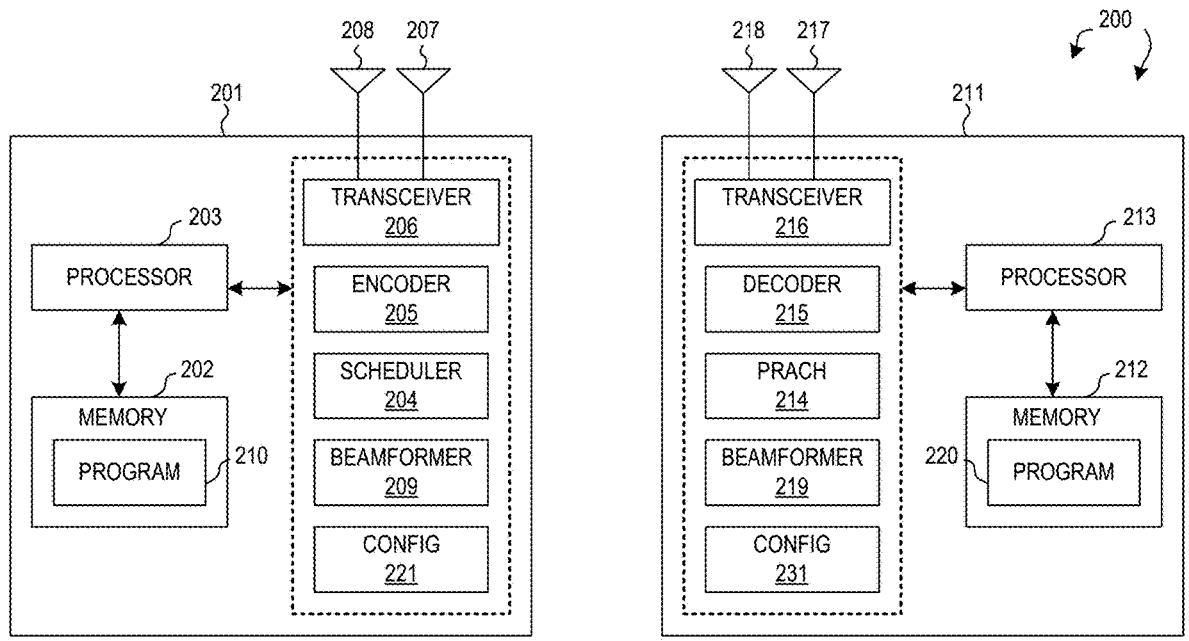
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a scheduler 204, a beamforming circuit 209, and a configuration circuit 221. Wireless device 211 is a receiving device that includes a decoder 215, a PRACH circuit 214, a beamforming circuit 219 and a configuration circuit 231. Note that a wireless device may be both a transmitting device and a receiving device. Both base station and user equipment can be a transmitting device and/or a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention accordingly.

In one example, base station 201 configures radio resource (PRACH) for UEs via configuration circuit 221, schedules downlink and uplink transmission for UEs via scheduler 204, encodes data packets to be transmitted via encoder 205 and transmits radio signals over various control beams by applying beamforming weights via beamforming circuit 209. UE 211 obtains allocated radio resources for PRACH via configuration circuit 231, receives and decodes downlink data packets via decoder 215, and transmits random access preambles over the PRACH resource via PRACH circuit 214 over a selected UL beam via beamforming circuit 219. The PRACH preamble is transmitted using a preamble TX power determined based on a power ramping counter, which is maintained and updated by UE 211 based on a PRACH preamble transmission condition comprising both a selected DL beam and a selected UL beam for the PRACH preamble transmission.

Figure 3:
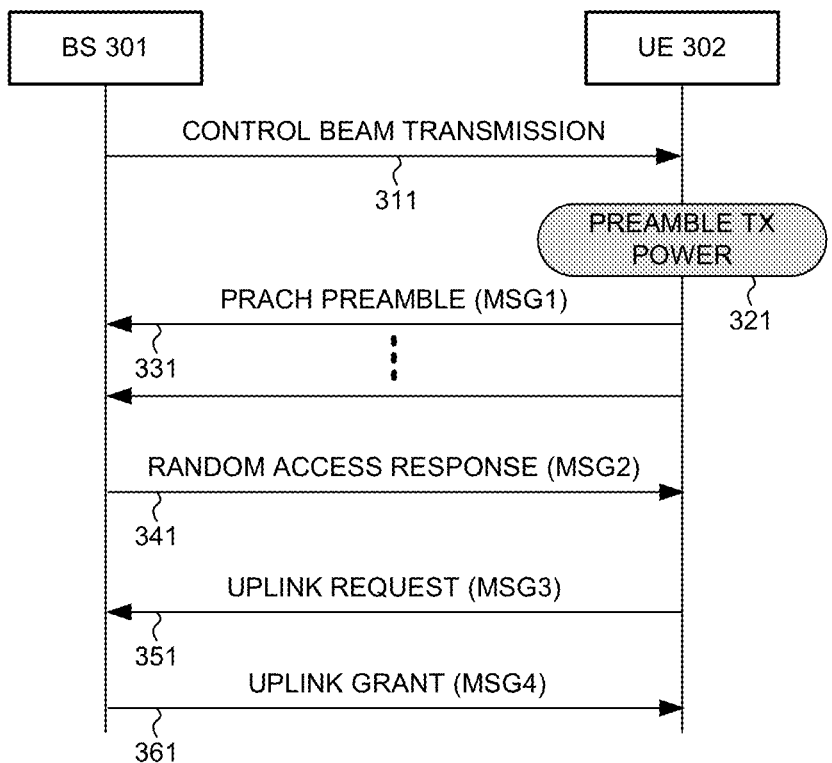
FIG. 3 illustrates a sequence flow between a base station and a user equipment for RACH procedure and PRACH preamble transmission power determination.

FIG. 3 illustrates a sequence flow between a base station BS 301 and a user equipment UE 302 for RACH procedure and PRACH preamble transmission power determination. In step 311, BS 301 transmits SS blocks system information and CSI-RS reference signals to UE 302 over corresponding DL beams. The DL beams have an association with PRACH resources, e.g., PRACH preambles and resource blocks. In step 321, UE 302 prepares for PRACH preamble transmission in two steps: 1) determines PRACH resource selection by deciding PRACH preamble and DL beam and UL beam; and 2) performs PRACH preamble transmission by applying the transmission power which is calculated based on a power ramping counter. In step 331, UE 302 transmits PRACH preamble (MSG1) to BS 301 using determined PRACH resource and preamble transmission power. UE 302 may repeat step 321 and step 331 and perform PRACH preamble retransmission until the PRACH preamble is successfully received by BS 301. In step 341, upon receiving the PRACH preamble, BS 301 transmits random access response (RAR, MSG2) back to UE 302 using a DL TX beam. The DL TX beam for MSG2 can be obtained based on the PRACH resource on which the PRACH preamble transmission is detected, and the association between PRACH resource and DL beam. In step 351, UE 302 sends an uplink request with UE identification (MSG3) to BS 301 using the select UL beam. In step 361, BS 301 sends an uplink grant (MSG4) to UE 302 for uplink transmission and completes the RACH procedure.

If UE switches PRACH resources at MSG1 transmission with a different SS block or CSI-RS than the one it previously chooses, it is regarded as a MSG1 retransmission within the same RACH procedure. UE configures its preamble transmission counter and power ramping counter as follows: the preamble transmission counter keeps increasing, and the power ramping counter can remain unchanged or keep increasing or decrease by a configurable value. For example, it remains unchanged if UE changes its UL TX beam, it keeps increasing if UE stays on the same UL TX beam, and it decreases by a configurable value to reduce interference to other UEs. If UE switches PRACH resources at MSG1 transmission but these RACH resources are associated with the same SS block or CSI-RS as the one it previously chooses, it is regarded as a MSG1 retransmission within the same RACH procedure. UE configures its preamble transmission counter and power ramping counter as follows: the preamble transmission counter keeps increasing, and the power ramping counter can remain unchanged if UE changes its UL TX beam, or keep increasing if UE stays on the same UL TX beam.

Figure 4:
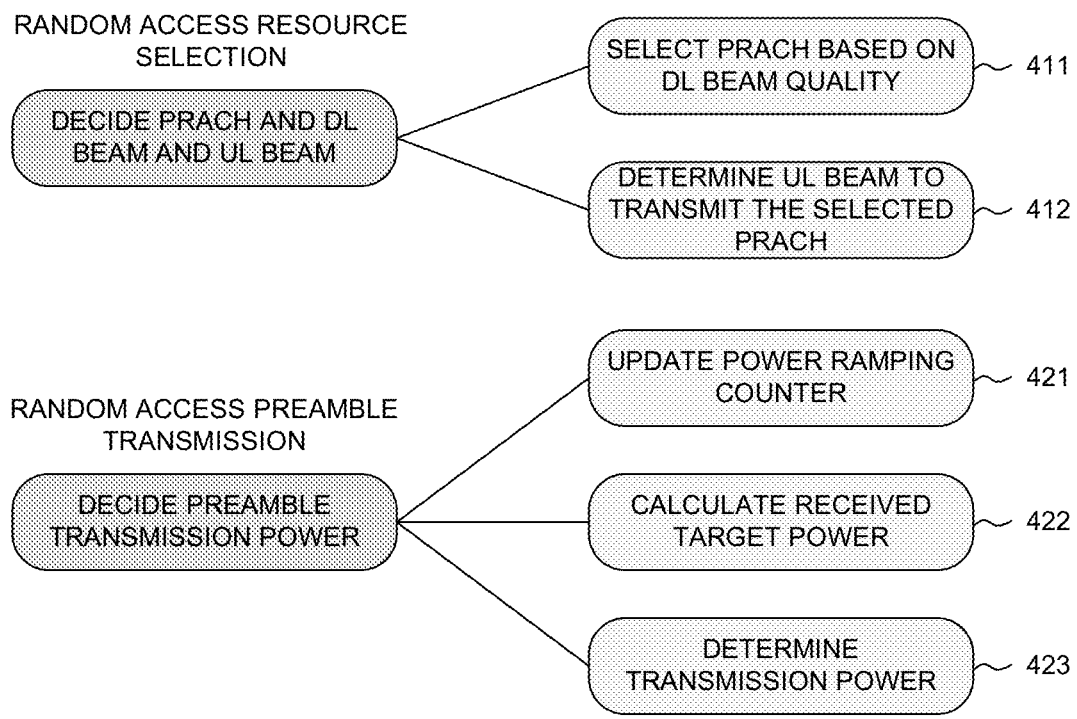
FIG. 4 illustrates an embodiment of supporting PRACH preamble transmission applying a power ramping counter in accordance with one novel aspect.

FIG. 4 illustrates an embodiment of supporting PRACH preamble transmission applying a power ramping counter in accordance with one novel aspect. When performing a RACH procedure, a UE first selects random access resource, and then transmits random access preamble. In the first stage of resource selection, the UE decides the PRACH resource, which comprises the PRACH preamble, a DL beam, and a UL beam. In step 411, the UE selects PRACH preamble based on DL beam quality. There is association between PRACH resources and DL beams. By UE measurements, some DL beams have low RSRP and some other DL beams have high RSRP. The UE selects one PRACH preamble from those PRACH preambles associated with a DL beam that is above a predefined RSRP threshold. This step can be performed by the MAC layer of the UE. In step 412, the UE determines an UL beam to transmit the selected PRACH preamble. This step can be performed by the PHY layer of the UE, and how PHY layer selects the UL beam is up to UE implementation. For example, the UE can select the UL beam based on the DL beam under TX/RX reciprocity.

In the second stage of preamble transmission, the UE decides the preamble transmission power, which is based on a power ramping counter. In step 421, the UE updates the power ramping counter. The power ramping counter is incremented by one if both DL beam and UL beam are the same as the previous selection, e.g., if transmission condition does not change, then increase power from the previous power value. Otherwise, the power ramping counter remains the same if either DL beam or UL beam has changed, e.g., if transmission condition changes, then try again with the previous power value. In step 422, the UE calculates a received target power at the base station using the power ramping counter. For example: Preamble-ReceivedTargetPower=PreambleInitialReceivedTargetPower+(power ramping counter−1)*PowerRamingStep. In step 423, the UE determines the preamble transmission power based on the pathloss (PL) of the selected UL beam and the received target power. The pathloss is calculated using a reference signal received power (RSRP) of the DL beam. Specifically, the PL related to the current selected UL beam needs to be calculated. For example, PreambeTransmissionPower=PreambleReceivedTargetPower+PL (that is related to the currently selected UL beam).

Figure 5:
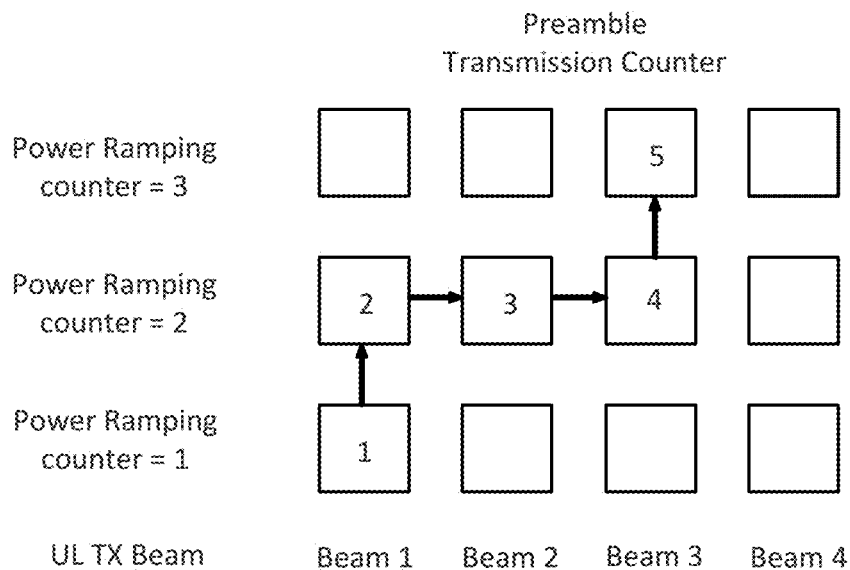
FIG. 5 illustrates examples of updating the power ramping counter in a RACH procedure in accordance with one novel aspect.

FIG. 5 illustrates examples of updating the power ramping counter in a RACH procedure in accordance with one novel aspect. In the example of FIG. 5, UE has four transmission TX beams 1-4. When UE starts a RACH procedure, the preamble transmission counter is initialized to be zero, and the power ramping counter is also initialized to be zero. UE manages the two counters separately. The preamble transmission counter is incremented by one every time when a PRACH preamble transmission or retransmission occurs. On the other hand, the power ramping counter is incremented by one only if both DL beam and UL beam are the same as the previous selection and remains the same if either DL beam or UL beam has changed.

In the example of FIG. 5, assume the DL beam selected is not changed throughout each of the PRACH preamble transmissions. For the first time, the UE selects UL TX beam 1 for preamble transmission, and the preamble transmission counter=1, the power ramping counter=1. For the second time, the UE selects the same UL TX beam 1 for preamble transmission, and the preamble transmission counter=2, the power ramping counter=2 (because both DL beam and UL beam remain the same). For the third time, the UE selects a new UL TX beam 2 for preamble transmission, and the preamble transmission counter=3, the power ramping counter=2 (because UL beam is changed). For the fourth time, the UE selects another new UL TX beam 3 for preamble transmission, and the preamble transmission counter=4, the power ramping counter=2 (because UL beam is changed). For the fifth time, the UE selects the same UL TX beam 3 for preamble transmission, and the preamble transmission counter=5, the power ramping counter=3 (because both DL beam and UL beam remain the same). It can be seen that the two counters are maintained separately during the PRACH preamble transmissions.

Figure 6:
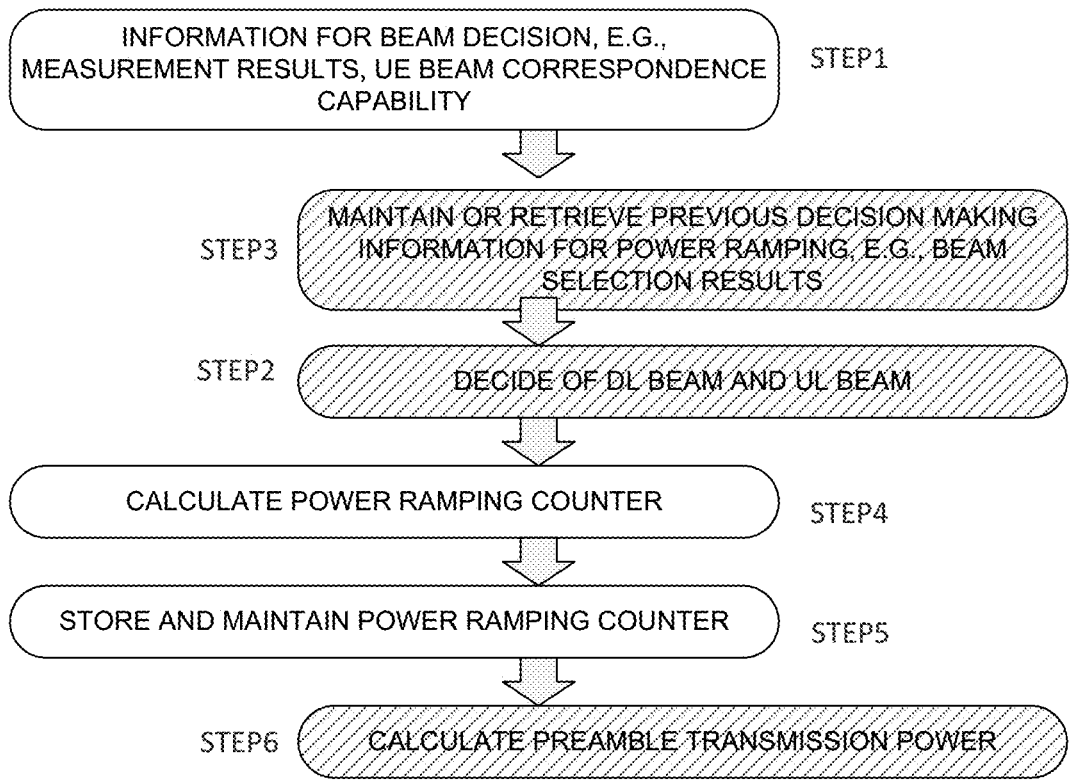
FIG. 6 illustrates examples of different PHY layer and MAC layer modeling in determining the power ramping counter and preamble TX power.

FIG. 6 illustrates examples of different PHY layer and MAC layer modeling in determining the power ramping counter and preamble TX power. There is interaction between PHY and MAC for handling the power ramping counter. In the example of FIG. 6, the MAC layer maintains the power ramping counter. In step 1, the MAC layer obtains information for beam decision, e.g., measurement results, UE beam correspondence capability. In step 2, the PHY layer maintains or retrieves previous decision-making information for power ramping, e.g., previous beam selection results. In step 3, the PHY layer decides the current DL beam and UL beam and notifies information to the MAC layer. The decision-making information includes whether PRACH resource/DL beam and/or UL beam is switched. In step 4, the MAC layer calculates the power ramping counter based on the decision-making information. In step 5, the MAC layer stores and maintains the power ramping counter and notifies the PHY layer. In step 6, the PHY layer calculates the preamble transmission power based on the power ramping counter.

Figure 7:
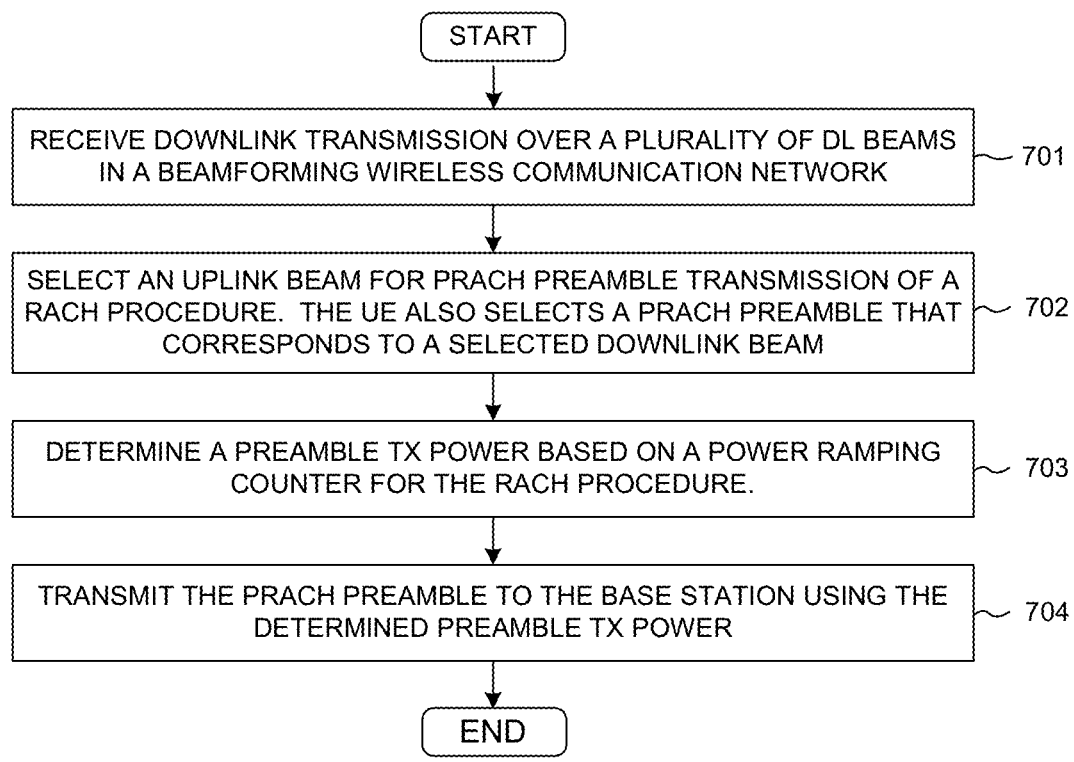
FIG. 7 is flow chart of a method of PRACH preamble transmission and preamble TX power determination in a beamforming wireless communication system in accordance with one novel aspect.

FIG. 7 is flow chart of a method of PRACH preamble transmission and preamble TX power determination in a beamforming wireless communication system in accordance with one novel aspect. In step 701, a UE receives downlink transmission over a plurality of downlink beams in a beamforming wireless communications network. In step 702, the UE selects an uplink beam for physical random-access channel (PRACH) preamble transmission of a RACH procedure, where the UE also selects a PRACH preamble corresponds to a selected downlink beam. In step 703, the UE determines a preamble TX power based on a power ramping counter for the RACH procedure. In step 704, the UE transmits the selected PRACH preamble from the UE to the base station using the determined preamble TX power. In one embodiment, the power ramping counter is incremented by one if the transmission condition remains the same as a previous PRACH preamble transmission. In another embodiment, the power ramping counter remains unchanged if the transmission condition is different from a previous PRACH preamble transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving downlink transmission from a base station over a plurality of downlink beams by a user equipment (UE) in a beamforming wireless communications network;
selecting an uplink beam for physical random-access channel (PRACH) preamble transmission of a RACH procedure, wherein the UE also selects a PRACH preamble that corresponds to a selected downlink beam;
determining a preamble TX power based on a power ramping counter for the RACH procedure, wherein the power ramping counter is determined based on a previous power ramping counter and a transmission condition of the PRACH preamble, and wherein the transmission condition comprises whether the selected downlink beam remains the same as a previous DL beam corresponds to a previous PRACH preamble transmission and whether the selected uplink beam remains the same as a previous UL beam used for the previous PRACH preamble transmission; and
transmitting the PRACH preamble from the UE to the base station using the determined preamble TX power.

2. The method of claim 1, wherein the UE transmits the PRACH preamble over PRACH resource blocks associated with the selected downlink beam.

3. The method of claim 1, wherein the power ramping counter is incremented by one if the selected downlink beam and the selected uplink beam remains the same as a previous PRACH preamble transmission.

4. The method of claim 1, wherein the power ramping counter remains unchanged if the selected downlink beam and the selected uplink beam are different from a previous PRACH preamble transmission.

5. The method of claim 1, wherein the UE separately maintains a preamble transmission counter to manage a maximum number of preamble transmission for the RACH procedure, and the preamble transmission counter is incremented by one every time when a PRACH preamble transmission occurs.

6. The method of claim 1, wherein the preamble TX power is determined to be equal to a preamble received target power plus an estimated pathloss associated with the selected uplink beam.

7. The method of claim 6, wherein the estimated pathloss is determined based on a reference signal received power (RSRP) of the selected downlink beam.

8. The method of claim 6, wherein the preamble received target power is determined to be a preamble initial received target power plus the power ramping counter multiplied by a power ramping step.

9. A user equipment (UE) comprising:
a radio frequency (RF) receiver that receives downlink transmission over a plurality of downlink beams in a beamforming wireless communications network;
a physical random-access channel (PRACH) handling circuit that selects an uplink beam for PRACH preamble transmission of a RACH procedure, wherein the UE also selects a PRACH preamble that corresponds to a selected downlink beam;
a power management circuit that determines a preamble TX power based on a power ramping counter for the RACH procedure, wherein the power ramping counter is determined based on a previous power ramping counter and a transmission condition of the PRACH preamble, and wherein the transmission condition comprises whether the selected downlink beam remains the same as a previous DL beam corresponds to a previous PRACH preamble transmission and whether the selected uplink beam remains the same as a previous UL beam used for the previous PRACH preamble transmission, wherein the UE separately maintains a preamble transmission counter for the RACH procedure; and
an RF transmitter that transmits the PRACH preamble from the UE to the base station using the determined preamble TX power.

10. The UE of claim 9, wherein the UE transmits the PRACH preamble over PRACH resource blocks associated with the selected downlink beam.

11. The UE of claim 9, wherein the power ramping counter is incremented by one if the selected downlink beam and the selected uplink beam remains the same as a previous PRACH preamble transmission.

12. The UE of claim 9, wherein the power ramping counter remains unchanged if the selected downlink beam and the selected uplink beam are different from a previous PRACH preamble transmission.

13. The UE of claim 9, wherein the UE separately maintains a preamble transmission counter to manage a maximum number of preamble transmission for the RACH procedure, and the preamble transmission counter is incremented by one every time when a PRACH preamble transmission occurs.

14. The UE of claim 9, wherein the preamble TX power is determined to be equal to a preamble received target power plus an estimated pathloss associated with the selected uplink beam.

15. The UE of claim 14, wherein the estimated pathloss is determined based on a reference signal received power (RSRP) of the selected downlink beam.

16. The UE of claim 15, wherein the preamble received target power is determined to be a preamble initial received target power plus the power ramping counter multiplied by a power ramping step.

* * * * *